US009101967B2

(12) United States Patent
Farkavec et al.

(10) Patent No.: US 9,101,967 B2
(45) Date of Patent: Aug. 11, 2015

(54) ROBOT FOR CLEANING AND INSPECTION OF CONDUITS AND ITS CONTROL UNIT

(75) Inventors: Petr Farkavec, Šemnice-Sedlečko (CZ); Vladimír Smutný, Nebušice (CZ)

(73) Assignee: NEOVISION, s.r.o., Prague (CZ)

( * ) Notice: Subject to any disclaimer, the term of this patent is extended or adjusted under 35 U.S.C. 154(b) by 542 days.

(21) Appl. No.: 13/386,868

(22) PCT Filed: Jul. 20, 2010

(86) PCT No.: PCT/CZ2010/000080
§ 371 (c)(1),
(2), (4) Date: Apr. 12, 2012

(87) PCT Pub. No.: WO2011/009420
PCT Pub. Date: Jan. 27, 2011

(65) Prior Publication Data
US 2012/0197440 A1    Aug. 2, 2012

(30) Foreign Application Priority Data

Jul. 24, 2009   (CZ) ................................ 2009-480

(51) Int. Cl.
*G06F 19/00*    (2011.01)
*B08B 9/049*    (2006.01)
(Continued)

(52) U.S. Cl.
CPC ............. *B08B 9/049* (2013.01); *B62D 55/065* (2013.01); *B62D 55/084* (2013.01); *B08B 9/04* (2013.01); *B08B 9/0495* (2013.01); *B08B 9/0497* (2013.01); *F16L 55/26* (2013.01); *F16L 2101/30* (2013.01)

(58) Field of Classification Search
CPC ........ F16L 55/26; F16L 2101/30; B08B 9/04; B08B 9/049; B08B 9/0495; B08B 9/0497; B62D 55/062; B62D 55/084
See application file for complete search history.

(56) References Cited

U.S. PATENT DOCUMENTS 4,244,296 A * 1/1981 Vertut ......................... 104/138.2
4,601,204 A * 7/1986 Fournot et al. ............... 73/866.5
(Continued)

FOREIGN PATENT DOCUMENTS

CN       1962091 A      5/2007
CN     101069890 A     11/2007
(Continued)

OTHER PUBLICATIONS

Annex to Form PTO/ISA/206 Communication Relation to the Results of the Partial International Search for International Application No. PCT/CZ2010/000080.
(Continued)

*Primary Examiner* — Khoi Tran
*Assistant Examiner* — Robert Nguyen
(74) *Attorney, Agent, or Firm* — Buchanan Ingersoll & Rooney PC (57) ABSTRACT

A robot for cleaning and inspecting conduits has a synchronizing mechanism, which extends all driving units simultaneously and with a constant normal force applied to the conduit wall. The robot may be equipped with adapters for conduits with rectangular cross section, and with extension bars for conduits with large diameters. Further, the robot may be equipped with sensors monitoring the robot status, these include a sensor of the synchronizing mechanism position, inclinometer and gyroscope. Data from these sensors may be displayed on a monitor. The movement of the robot inside the conduit and therefore the speed of individual tracks is controlled by the operator by three control elements: direction of turning, diameter of bend and speed of motion. The robot is also able to travel backwards inside the conduit automatically based on stored information about forward movement.

8 Claims, 7 Drawing Sheets

(51) Int. Cl.
  B62D 55/065 (2006.01)
  B62D 55/084 (2006.01)
  F16L 101/30 (2006.01)
  F16L 55/26 (2006.01)
  B08B 9/04 (2006.01)

(56) References Cited

U.S. PATENT DOCUMENTS

| | | | |
|---|---|---|---|
| 4,785,512 A * | 11/1988 | Sigel | 29/33 T |
| 4,938,167 A | 7/1990 | Mizuho et al. | |
| 5,113,885 A | 5/1992 | Ramsey | |
| 5,172,639 A * | 12/1992 | Wiesman et al. | 104/138.2 |
| 5,284,096 A * | 2/1994 | Pelrine et al. | 104/138.2 |
| 5,528,789 A | 6/1996 | Rostamo | |
| 5,878,783 A | 3/1999 | Smart | |
| 6,019,048 A | 2/2000 | Seeberger et al. | |
| 6,026,538 A | 2/2000 | Watanabe | |
| 6,101,951 A | 8/2000 | Sigel | |
| 6,402,854 B1 | 6/2002 | Horridge | |
| 7,210,364 B2 | 5/2007 | Ghorbel et al. | |
| 8,028,559 B2 * | 10/2011 | Toeniskoetter | 72/214 |
| 8,237,787 B2 * | 8/2012 | Hollinger | 348/82 |
| 2002/0102136 A1 | 8/2002 | Holland | |
| 2005/0104600 A1 | 5/2005 | Cotton | |
| 2008/0092672 A1 * | 4/2008 | Gibson et al. | 73/865.8 |
| 2008/0098834 A1 | 5/2008 | Sergoyan et al. | |

FOREIGN PATENT DOCUMENTS

| | | |
|---|---|---|
| CN | 101435522 A | 5/2009 |
| EP | 0105418 A1 | 4/1984 |
| EP | 1054752 | 11/2000 |
| EP | 1 486 755 A2 | 12/2004 |
| GB | 2 214 263 A | 8/1989 |
| GB | 2 408 340 A | 5/2005 |
| JP | 2001-096246 A | 4/2001 |
| WO | WO 99/46085 A1 | 9/1999 |

OTHER PUBLICATIONS

International Search Report (PCT/ISA/210) issued on Feb. 7, 2012, by European Patent Office as the International Searching Authority for International Application No. PCT/CZ2010/000080.

Written Opinion (PCT/ISA/237) issued on Feb. 7, 2012, by European Patent Office as the International Searching Authority for International Application No. PCT/CZ2010/000080.

* cited by examiner

ROBOT FOR CLEANING AND INSPECTION OF CONDUITS AND ITS CONTROL UNIT

BACKGROUND OF THE INVENTION

The invention deals with technical solution of a robot for cleaning and inspection of conduits and its control unit.

DESCRIPTION OF PRIOR ART

Ventilating, air-conditioning, and exhausting conduits suffer by deposition of dirt on the inner walls, which could have negative health (e.g. legionella type bacteria), fire (e.g. flammable deposits), or functional (narrowing cross section) impacts on its use. Presence of deposits above certain level is solved either by replacement of the conduit, or by cleaning of its inner surface. Small diameter of some such conduits makes manual cleaning virtually impossible.

Several technologies dealing with robotic cleaning of conduits exist (U.S. Pat. No. 6,026,538). One of them is brushing of inner surface (U.S. Pat. No. 5,528,789, CN101069890).

U.S. Pat. No. 6,026,538 suggests to whirl deposited dirt by air blast or by brush but it does not solve the way how to remove firmly attached dirt. Similarly, U.S. Pat. No. 5,528,789 proposes a robot equipped with brush, which whirls lightly attached dirt. Another robot whirling the dirt by brush is disclosed in patent application CN10169890. Patent number JP2001096246 again proposes brushing for cleaning of water conduits. For removing firmly attached deposits, solid fats and oils, asphalts, or baked dirt brushing is unsuitable.

Yet another cleaning method using washing devices is disclosed in CN1962091.

Alternative cleaning method is blasting of inner surface. Suitable for this purpose seems to be water blasting, clean air blasting, or dry ice blasting. Water blasting is unsuitable for most of the air ducts as the water would flood the space or technological equipment located beneath the duct. Clean air blasting allows to remove only lightly attached deposits. Dry ice blasting is capable of removing solidified, adherent, and baked dirt. For cleaning of kitchen extraction ducts EP1054752 proposes to use dry ice blasting, while the blasting nozzle is placed on a trolley. This patent application does not specify the design of such trolley.

Dry ice blasting is a very promising technology because it allows to erode dirt deposits like solidified grease, baked oils, asphalts and rubber without any damage to the duct and without introduction of additional blasting means, such as sand, water or similar.

There are multiple technical solutions and patents aiming to solve design of robots, which can travel in conduits for pressurized gas distribution (U.S. Pat. No. 5,878,783), for liquids distribution (U.S. Pat. No. 6,019,048) or for sewerage (U.S. Pat. No. 6,101,951). U.S. Pat. No. 5,878,783 discloses a robot, which is suitable for traveling in the conduit of specific diameter and with large radii of bends. U.S. Pat. No. 6,019,048 discloses a robot, which uses different mechanism of centralization of the robot body within the conduit, however it also is useful only in conduits of large radii of bends and well defined conduit diameter.

Patent CN1962091 describes washing devices located on a parallelogram, which is forced against the duct walls by a spring. The robot moves by the force created by the pressure drag of elastic piston against the surrounding liquid.

For cleaning water conduits patent JP2001096246 proposes a propeller to ensure the robot's movement in water environment.

Most of the existing robots intended for motion in air conduits are able to inspect the conduit by camera system or to transport light equipment, e.g. rotating brushes. U.S. Pat. No. 6,101,951 discloses gravitational robot (the robot lies on the lower part of the conduit fixed by the gravity only) designed for sewerage pipes, similarly as many other competing sewerage robots, because sewerage piping has defined, small and constant slope, and for most applications no additional fixing of the robot by struts against radial or tangential forces is necessary.

In order to centralize a robot in the duct U.S. Pat. No. 5,113,885 and CN1962091 propose to use a spring, which however does not guarantee constant normal force to the wall for different conduit diameters.

U.S. Pat. No. 7,210,364 and CN101435522 propose an articulated robot driven by passive wheels using a screw-drive propulsion system. Due to rather varied obstacles in the conduit this principle of drive cannot be used in air conduits. In addition, this method cannot be adapted for conduits with rectangular cross section.

Another articulated robot is proposed in EP105418. Need for articulated robots is enforced by confined space in small diameter ducts; ventilation ducts do not impose such limitations.

CN101069890 suggests use of magnetically attached walking legs for robot motion. For this method however it is difficult to handle conduits bends and branching.

Air conduits differ from conduits designed for other media by using both circular and rectangular cross sections, by the presence of transitions between circular and rectangular cross sections, by low strength of the conduit wall and by frequent branching. Typically, their diameter is large but the radius of the bends is small compared to the diameter; as a standard, the bend radius is equal to the conduit diameter but conduits with bent radius close to the half of conduit diameter are common. Air conduits feature frequent bends and branching per length measuring unit defined by the conduit diameter compared to other types of the conduits. The robot shall be able to travel through bends with the small radii and pass branching. The robot shall be able to travel horizontally, in sloped conduits as well as vertically both up and down. The robot intended for dry ice blasting should be able to drag a hose transporting dry ice and pressurized air, which has high rigidity and large specific weight per length unit. The diameter of the hose transporting dry ice is typically ¾" or 1", while the pressure of medium is 6-15 bars. Another requirement for the robot is to keep the pivoting spraying nozzle, which applies the cleaning medium, centralized in the conduit axis.

Existing solutions are either not capable of dragging longer sections of heavy hoses, working in large and varying diameter conduits, passing the conduit bends and branches, or they are not able to automatically center the cleaning medium nozzle or to resist radial forces caused by the flowing medium. No system was able to satisfy all these requirements simultaneously, while partial solutions of these problems contradicted each other.

Another setback of all solutions known so far is complex control of multiple driving units when passing bends since the operator is not able to control multiple parameters in real time at once. Next source of problems is possible slippage of tracks because the conduit surface has various value of friction coefficient and depends on the type of deposited dirt. Dirt ranges from rubber/asphalt type deposits with high friction coefficient to grease/oil deposits with low value of friction coefficient.

Robots with bodies articulated and longer than conduit diameter (U.S. Pat. No. 7,210,364, EP105418) could use slippage of individual wheels or tracks without the risk of jamming. If the robot length is shorter or comparable with the conduit diameter, driving units require precise control. Dragging a hose transporting cleaning medium also requires that all driving units use their friction force for dragging to the fullest extent.

Two-track robots are typically controlled by different speed of tracks while turning. Operator usually controls directly the track speed. Where multiple tracks are used while each track should have different speed, direct control is impossible because the operator is not able to control multiple tracks at the same time.

SUMMARY OF THE INVENTION

The above mentioned setbacks are solved in a robot for cleaning and inspection of conduits and its control unit as proposed. This robot consists of a robot body, nozzle for cleaning medium connected to the hose for cleaning medium, where on the front side of the robot a headlight and a video camera are placed. The nozzle for cleaning medium passes through axis of the robot body, to which minimum three drive units with tracks or wheels are radial-symmetrically attached, which contain control unit, electrical drive and gearbox for transfer of drive motion to the track or wheels. The principle of the proposed solution is that the robot is equipped with synchronizing mechanism moved by rectilinear prismatic joint placed inside the robot body. This prismatic joint consists of a guiding device of synchronizing mechanism, which is attached to the robot body and on which a carriage is attached. Carriage can move in direction of the robot body longitudinal axis and to this carriage, driving units are symmetrically attached by means of identical mechanisms producing translational motion. The carriage is connected to the actuator of synchronizing mechanism, which is controlled from robot control unit by operator via electrical cable.

In an advantageous embodiment the actuator of synchronizing mechanism is pneumatic one. Such pneumatic actuator could in one embodiment consist of a set of pneumatic cylinders with axes parallel to the longitudinal axis of the robot body and attached to the robot body. Their piston rods are attached to the carriage. Pneumatic cylinders are in a preferred embodiment attached to the air pressure regulator, which can be located in the control unit or separately.

One possibility how to design mechanisms forming prismatic joints for driving units is that a rod is attached to the carriage via the first pin. This rod is then connected by means of the second pin with the first arm, which is pivotally attached to the third pin in a box, which is firmly attached to the body. The other end of the first arm is pivotally attached by means of the fourth pin to the driving unit, to which one end of the second arm is also pivotally attached. The other end of the second arm is pivotally attached to the box, thus forming a parallelogram with the first arm.

A great advantage is when the plane passing through the second and third pin axes and the plane passing through the third and fourth pin axes are perpendicular to each other because when the rod is sufficiently long or the second pin is placed in the carriage in a manner allowing movement perpendicular to the robot axis, the normal force applied by the driving unit to the conduit wall is then directly proportional to the air pressure in the pneumatic actuator.

Another possible improvement is when extension bars are firmly attached by their one end to the driving units, having their other end pivotally attached to the first and the second arms. Such extension bars will allow the robot to move in conduit with larger diameter while maintaining the normal force applied by the driving unit to the conduit wall.

In case the conduit has rectangular cross section the driving units are equipped with adapters where their one end is firmly attached to relevant driving unit and their other end is pivotally attached to the first and the second arm. These adapters are bent in an angle ensuring perpendicular position of relevant driving unit against the inner wall of rectangular conduit.

Another possible alternative is that the body contains a sensor of synchronizing mechanism position, which is attached to this body and to the carriage and it is interconnected with a monitor displaying measured value. Position sensor allows to find out that the robot enters into conduit with smaller diameter and more importantly it allows to detect situation when the robot axis is not parallel with the conduit axis.

Another possible alternative is that the body contains an inclinometer, which is attached to this body and it is interconnected with a monitor displaying measured values. Inclinometer allows to inform the operator about the robot orientation in the conduit and makes control of the robot easier for the operator.

Another possible alternative is that the body contains a gyroscope, which is attached to this body and it is interconnected with a monitor displaying measured values. Gyroscope informs the operator about the robot orientation in the conduit and makes control of the robot easier for the operator.

Control panel is formed by a central control unit. The first input of the central control unit is connected with the output of the first control element for setting required radius of the robot turning in a bend. The second input of the central control unit is connected with the second control element for setting required direction of the robot turning in a bend. The third input of the central control unit is connected with the third control element for setting the robot speed. Output of the central control unit is interconnected with inputs of control units of driving units. Possible alternative is that the output of the central control unit is connected to the control units of driving units via a memory management module, which is further bi-directionally connected with buffer-type memory.

Preferably, the output of the camera in the robot can be connected to the monitor via a picture rotating module, which is further connected with the output of inclinometer. Picture rotating module rotates the picture in such a manner to maintain its proper orientation with respect to vertical line regardless of the robot and camera orientation in the conduit.

Monitor also displays information from control units of driving units.

Proposed solution presents a robotic system able to travel inside air conduits and similar, especially with large diameter, turn in their bends and pass branches. The robot is able to travel inside horizontal, sloped as well as vertical conduits. The robot is able to drag a hose of great weight. The robot is equipped with a camera and applicator of mixture. Mixture may include pressurized air, high-pressure water and/or a stream of dry ice particles within a stream of pressurized air. Design of the robot keeps the robot body centralized in the conduit. Applicator centralized in this way achieves the best parameters of cleaning.

OVERVIEW OF FIGURES IN DRAWINGS

The robot will be further described by means of attached drawings.

DETAILED DESCRIPTION OF THE PREFERRED EMBODIMENTS

Figure 1:
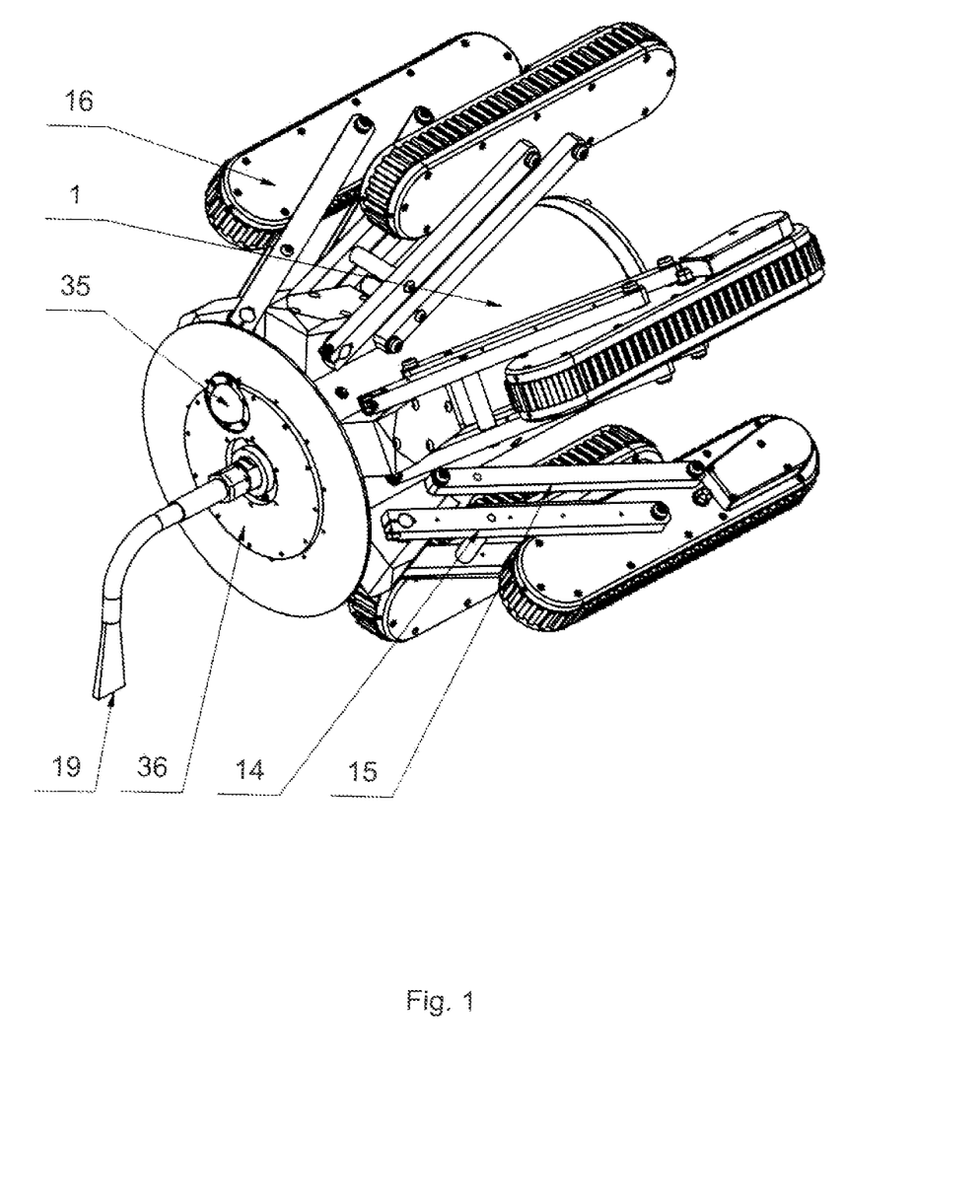
FIG. 1 shows the robot in an axonometric view.
Figure 2:
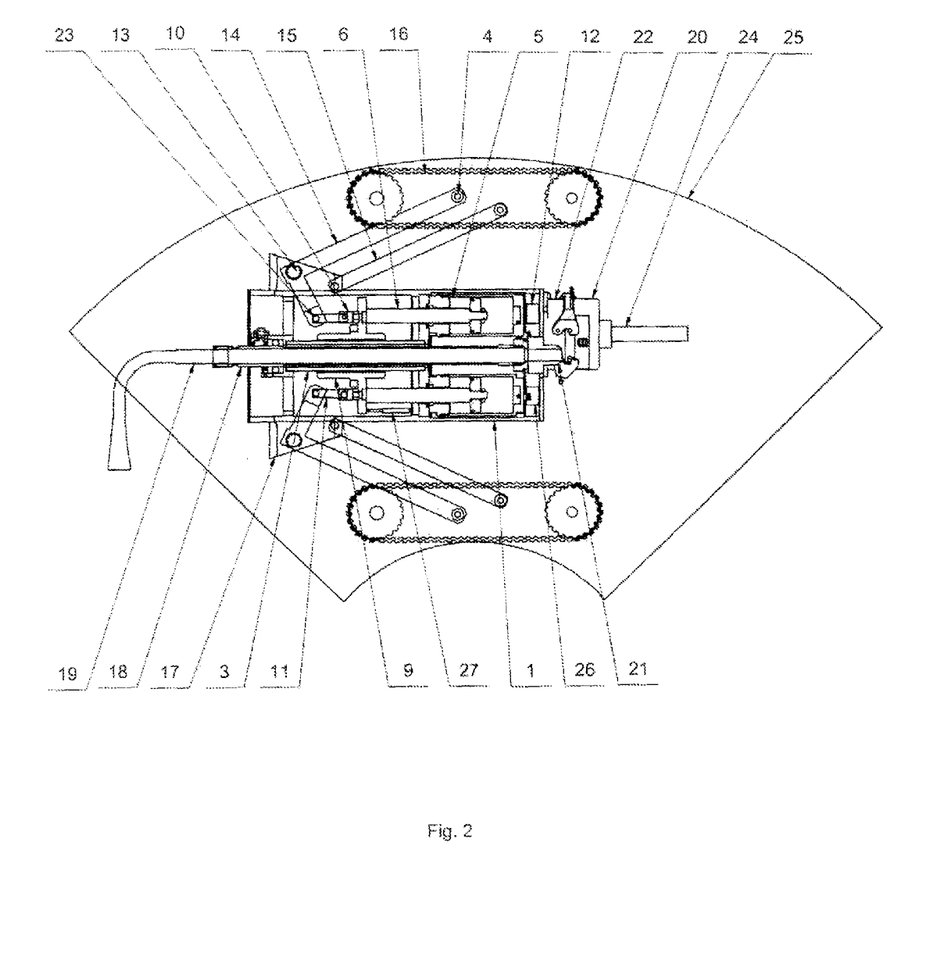
FIG. 2 shows section of the robot.
Figure 4:
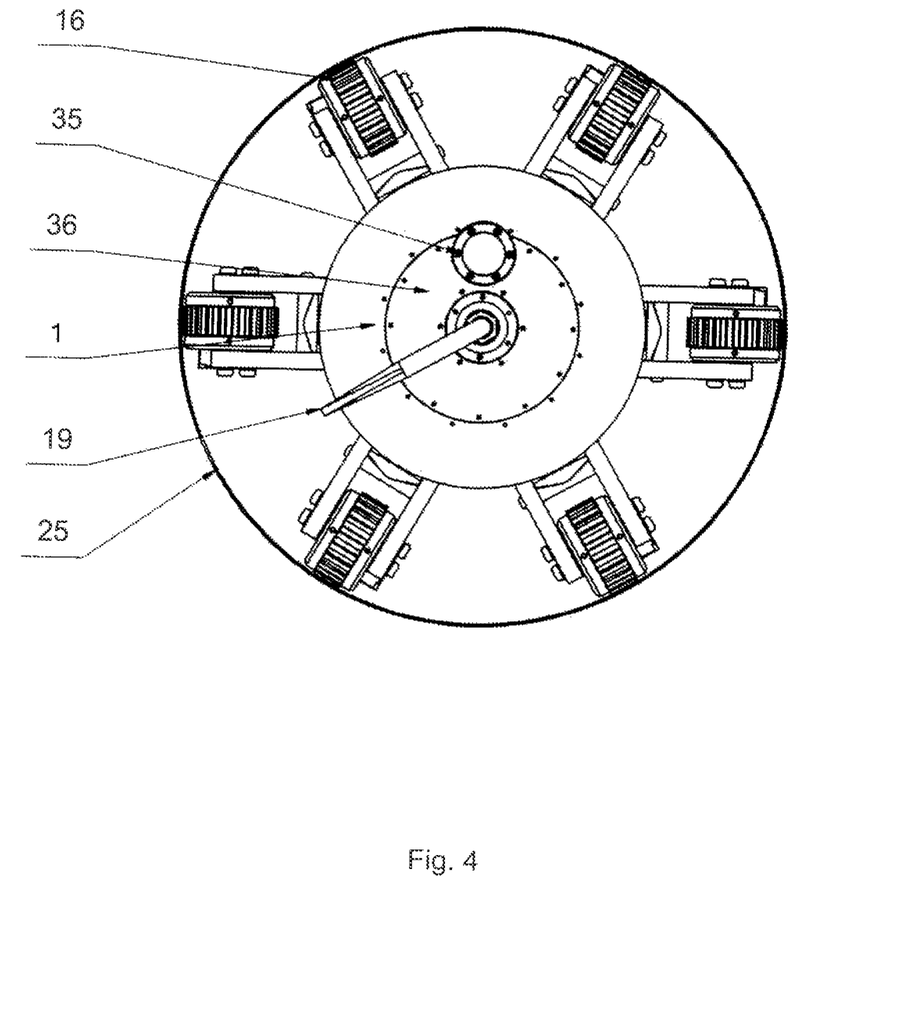
FIG. 4 shows a front view of the robot inside a conduit.

Robot for cleaning and inspection of conduits according to the presented solution, FIG. 1, 2, 4, consists of the body 1, which accommodates a hose 18 with cleaning medium, to which a nozzle 19 for cleaning medium is attached. On the front side of the body 1 are installed a headlight 36 and a video camera 35 in a way common to this type of devices. Hose 18 of the cleaning medium here passes through axis of the body 1, to which are radial-symmetrically attached minimum three driving units 16 with tracks or wheels. The robot 111 is equipped with a synchronizing mechanism formed by a rectilinear prismatic joint placed inside the body 1. This rectilinear prismatic joint consists of a guiding device 3 of the synchronizing mechanism attached to the body 1. On the guiding device 3 is placed a carriage 9, which is sliding in direction of the longitudinal axis of the body 1. Driving units 16 are attached to the carriage 9 symmetrically via identical mechanisms forming prismatic joints. Carriage 9 is attached to the actuator of the synchronizing mechanism, which is controlled from the robot control panel 110 via cable 24. Drive in the presented example is pneumatic one. The drive here is formed by a set of pneumatic cylinders 5, which are parallel with the longitudinal axis of the body 1 and are attached to this body 1. Piston rods 6 of the pneumatic cylinders are attached to the carriage 9. Pneumatic cylinders 5 in given example are further connected to the regulator 101 of air pressure.

Mechanisms forming prismatic joints for driving units 16 in given example are formed as follows. A rod 11 is attached to the carriage 9 via the first pin 10 and the rod 11 is then connected by means of the second pin 23 with the first arm 14. The first arm 14 is pivotally attached to the third pin 13, which is placed in a box 17. The box 17 is firmly attached to the body 1. The other end of the first arm 14 is pivotally attached by means of the fourth pin 4 to the driving unit 16. To this driving unit 16 is also pivotally attached one end of the second arm 15, while the other end of the second arm 15 is pivotally attached to the box 17, thus forming a parallelogram with the first arm 14.

It is advantageous when the following condition is fulfilled where the plane passing through the second pin 23 and third pin 13 axes and the plane passing through the third pin 13 and fourth pin 4 axes are perpendicular to each other. If the rod 11 is sufficiently long or the second pin 23 is placed in the carriage 9 in a manner allowing movement perpendicular to the robot body 1 axis, the normal force applied by the driving unit 16 to the conduit 25 wall is directly proportional to the air pressure in the pneumatic actuator.

Figure 3:
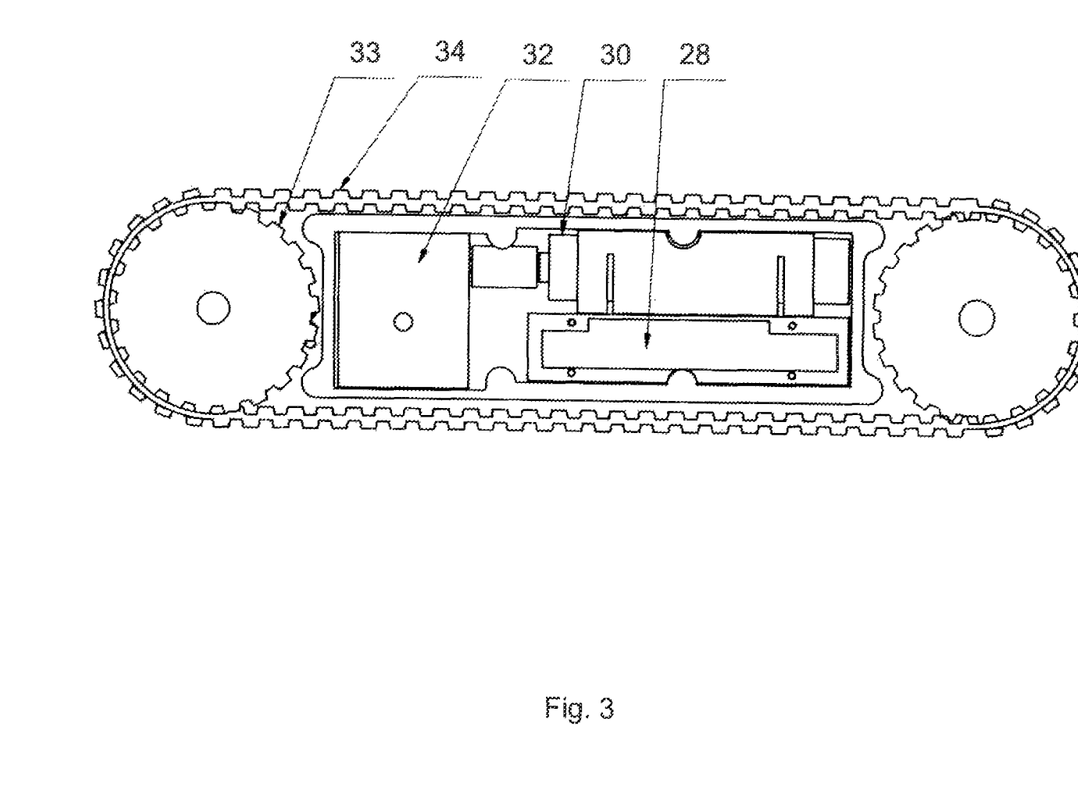
FIG. 3 shows section of the driving unit.

Proposed robot moves by means of multiple individual driving units 16 placed radial-symmetrically on the body 1. Driving units 16 use tracks or wheels. Driving units 16, see FIG. 3, contain a control unit 28, electrical drive 30 and gearbox 32 transferring driving forces to tracks or wheels.

As far as the synchronizing mechanism is concerned, it forms a single common mechanism for all driving units 16. In given example it contains a guiding device 3, carriage 9, first pin 10, second pin 23 and sensor 27 of the synchronizing mechanism position, see FIGS. 1 and 7. Synchronizing mechanism provides for synchronization of mutual position of driving units 16 against each other. On one side the synchronizing mechanism here is attached to piston rods 6 of pneumatic cylinders 5 and on the other side it is attached to driving unit 16 via the first arm 14 and the second arm 15 and via the third pin 13. By its nature the synchronizing mechanism ensures that the contact areas between driving units 16 and cleaned conduit 25 lay on a cylindrical surface in case of circular conduit section regardless of current diameter of the conduit.

Driving units 16 are expanded by the synchronizing mechanism driven by pneumatic cylinder 5. Pneumatic cylinder 5 is here used as a source of constant force because it is connected to constant air pressure adjusted by regulator 101, FIG. 7. Regulator 101 allows to set the air pressure in such a way it will correspond to required normal component of force between the driving unit 16 and conduit 25. Air with set pressure is transferred by supply cable 24 via coupling 20 on the cable and coupling 22 on the body 1.

Carriage 9, onto which the motion of piston rods 6 of pneumatic cylinders 5 is transferred, is guided by the fixed part of the guiding device 3, which is firmly attached to the body 1. Rod 11 is attached to the carriage 9 via the first pin 10 and the rod 11 is further connected by means of the second pin 23 with the first arm 14. First arm 14 is pivotally attached to the third pin 13 in a box 17. The box 17 is firmly attached to the robot body 1. First arm 14 is pivotally attached to the driving unit 16 by means of the fourth pin 4. Second arm 15 is pivotally attached to the box 17 and to the driving unit 16. First arm 14 and second arm 15 form a parallelogram, which ensures parallel alignment of the body 1 axis with the driving unit 16.

Actuator in the presented example is formed by a set of pneumatic cylinders 5, which surround the central space for media supply. Actuator can also be designed using a single pneumatic cylinder with piston rod with co-axial aperture, through which passes the hose 18 for cleaning medium.

Guiding device 3 and the carriage 9 eliminate asymmetry of forces from individual piston rods 6 applied to the carriage 9 and asymmetry of forces from individual driving units 16.

Right angle between the plane passing through the axis of the second pin 23 and the third pin 13 and the plane passing through the axis of the third pin 13 and the fourth pin 4 in connection with sufficiently long rod 11 ensures that normal force between the driving unit 16 and cleaned conduit 25 is almost directly proportional to air pressure in pneumatic cylinders 5.

Figure 5:
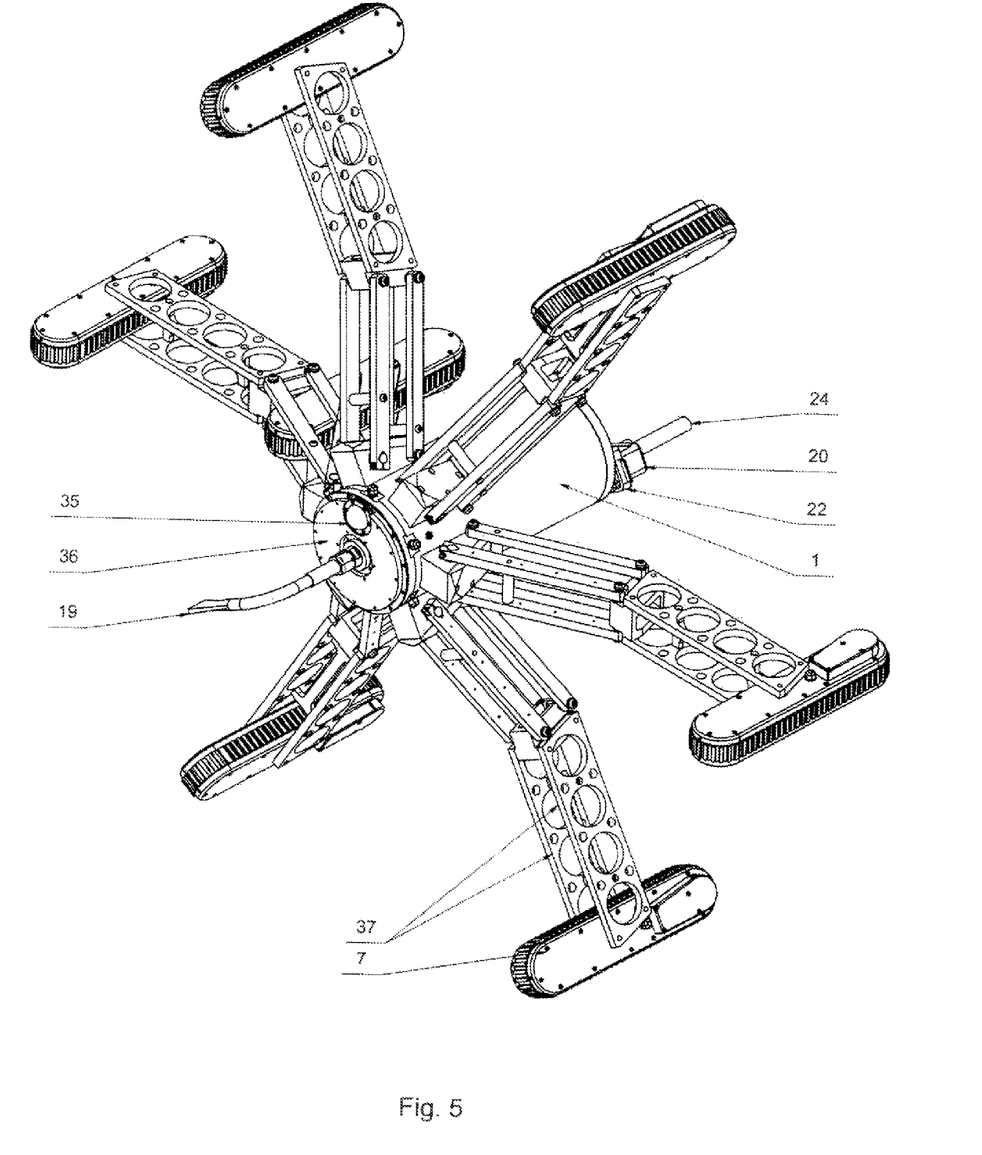
FIG. 5 is an axonometric view of the robot with extension bars for large diameters of conduit.

For large diameters of conduit 25 the parallelograms can be further adjusted by extension bars 37, FIG. 5, which extend the distance of driving units 16 from the robot 111 body 1. Such extension bars will allow the robot 111 to travel in conduit 25 with large diameter while maintaining the normal force of driving unit 16 to the wall of conduit 25.

Figure 6:
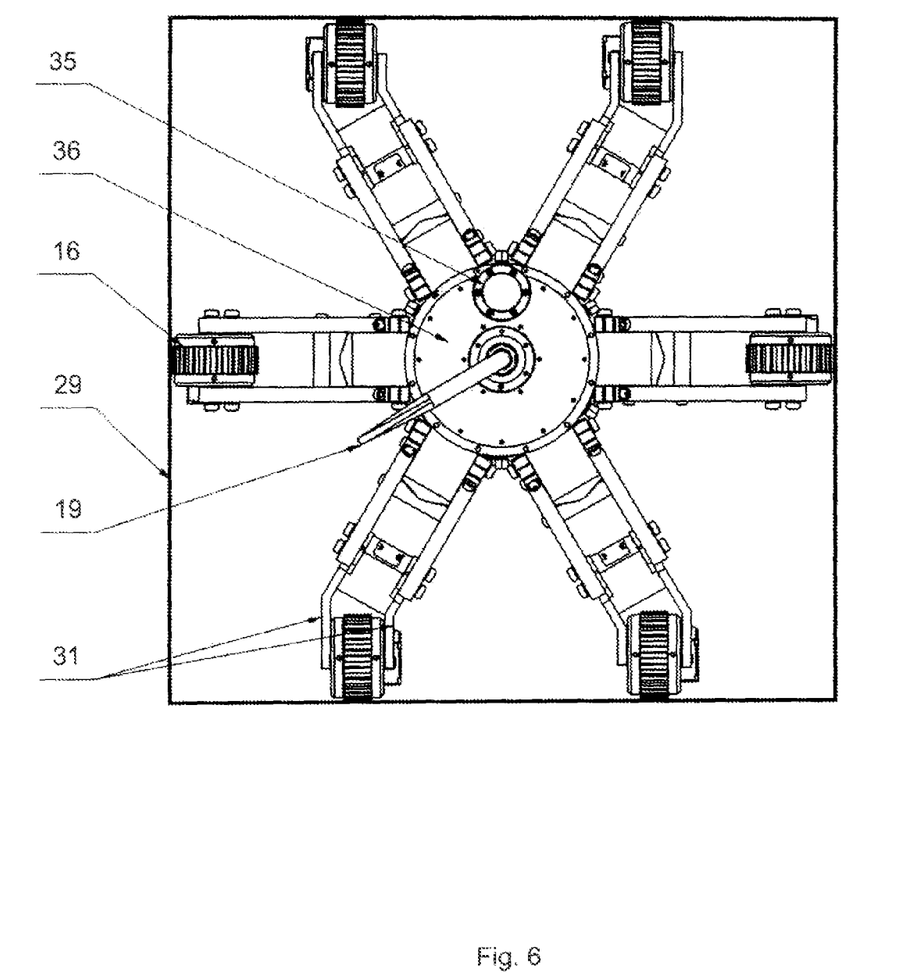
FIG. 6 shows a front view of the robot with adapters for rectangular conduit.

For rectangular conduits 29 the driving units 16 can be equipped with adapters 31, FIG. 6, which adjust direction of the driving units 16 so that they are perpendicular to the surface of conduit 29. Their dimensions allow to adjust for dimensions of the conduit 29. Such adapters 31 are bent in an angle ensuring perpendicular position of relevant driving unit 16 against the inner wall of rectangular conduit 29.

Figure 7:
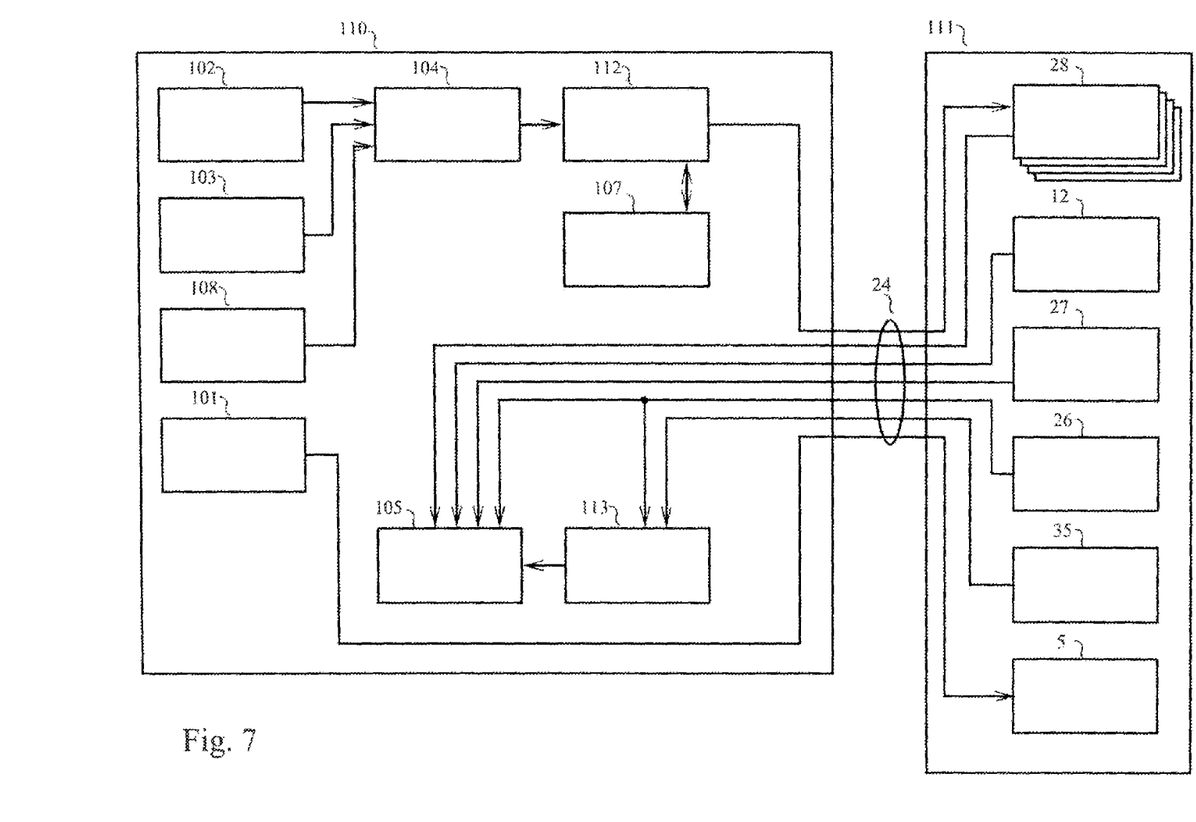
FIG. 7 shows the diagram of the robot control.

For the robot control was created special control panel. This control panel 110 is formed by a central control unit 104. The first input of the central control unit 104 is connected with the output of the first control element 102 for setting required radius of the robot 111 turning in a bend. The second input of the central control unit 104 is connected with the output of second control element 103 for setting required direction of the robot 111 turning in a bend. The third input of the central control unit 104 is connected with the output of third control element 108 for setting the robot speed in conduit. In given example the central control unit 104 is interconnected with a memory management module 112. Memory management module 112 is interconnected with a buffer memory 107 and its outputs are connected to inputs of control units 28 of driving units 16. This interconnection enables automatic reverse movement of the robot 111; if the robot will not be equipped with this functionality, the memory management module 112 and buffer memory 107 are omitted and the central control unit 104 is connected with the control units 28 of driving units 16 directly. In given example the outputs of a gyroscope 12, inclinometer 26, sensor 27 of the synchronizing mechanism position, and control units 28 are connected to a monitor 105 in control panel 110. Camera 35 is connected to the monitor 105 via a picture rotating module 113, to which is also connected the output of inclinometer 26. It is advantageous if the control panel 110 contains also a regulator 101 for setting the pressure of air in the synchronizing mechanism actuator.

Synchronizing mechanism has a basic position, in which all driving units 16 are as close to the robot 111 body 1 axis as possible. Basic position of the robot 111 allows for its easy insertion into conduit 25. Once the robot 111 is inserted, suitable air pressure is adjusted and introduced into pneumatic cylinders 5 of the synchronizing mechanism and this will automatically centralize the robot 111 inside the conduit 25. The robot 111 is then ready for inspection or cleaning.

The robot 111 is connected by means of cable 24 with control panel 110. Cable 24 brings electrical power supply and pressurized air to the pneumatic cylinders 5 of the robot 111 and provides for communication between the control panel 110 and the robot 111.

Pressure of air in pneumatic cylinders 5 of the synchronizing mechanism and subsequently also the contact pressure force of the driving unit 16 to the wall of conduit 25 is controlled by pressure regulator 101 at the control panel 110.

System proposed for movement control is based on determination of direction, in which lays the plane passing through the axis of cleaned conduit 25, and defining the radius of bending, FIG. 7. Direction of the bend plane, or required direction of turning the robot 111 in a bend respectively, is set by the operator based on picture from the camera 35 by the second control element 103. This information is taken to the central control unit 104, which upon such information controls individual control units 28 of driving units 16. Direction of the bend plane is simultaneously displayed on the monitor 105. Bend radius, or required radius of turning the robot 111 in a bend respectively, is set by the first control element 102. Information passed on to the central control unit 104 about what radius should be set is taken from drawings of the conduit 25, or from direct view of such conduit 25, which in industrial environment is often visible, or from the picture from the camera 35. Based on feedback seen in the picture from the camera the operator can interactively readjust the plane of the bend and radius of the bend. Required speed of the robot 111 movement inside the conduit 25 is set by the third control element 108.

Operator therefore enters instructions for control by means of described three control elements and they are translated and displayed in the live picture on the monitor 105 showing the plane of the bend as an arrow. Thus the operator is able to very finely adjust and check the direction, in which the robot 111 will be turning, and continuously keep checking whether the robot 111 follows required trajectory.

Relation between the inputs and outputs of the central control unit 104 is as follows. For each control unit 28 is calculated an angle between the vector directed into the bend, which is entered by the second control element 103, and vector perpendicular to the axis of the conduit 25 and directed to relevant driving unit 16; this angle is marked A. Radius of bend measured in multiples of diameter of the conduit 25 as a non-dimensional number and entered by the first control element 102 is marked R. Speed of the robot 111 movement in the conduit 25 entered by the third control element 108 is marked V. Output of the central control unit 104 for relevant control unit 28 of driving unit 16 is then calculated using formula $(R-\cos(A)/2)/(R+½)*V$.

Control units 28 of driving units 16 send information about travelled distance to the monitor 105, which displays measured values.

Camera 35 takes picture of the conduit 25 before robot 111 and the picture is taken to picture rotating module 113, while to its second input is taken information from inclinometer 26, which determines how much the picture should be rotated. Rotated picture is taken from the picture rotating module 113 to the monitor 105. Picture from the camera 35 is displayed on the monitor 105 rotated around the center of the picture in such a manner that vertical plane passing through optical axis of the camera 35 is displayed in the line, which vertically passes through the center of the picture on the monitor 105. Picture rotating module 113 rotates the picture based on information from inclinometer 26. Picture on the monitor 105 is therefore always displayed in orientation natural for the operator, it means the bottom part in the picture is the bottom in recorded scene and the top part in the picture is the top in recorded scene. This facilitates orientation of the operator in the picture. Around the picture from camera 35 on the monitor 105 are displayed data about current positions of driving units 16 relating to the picture. To the monitor 105 are further taken data from inclinometer 26, gyroscope 12 and sensor 27 of the synchronizing mechanism position, it means extension of pneumatic cylinders 5.

Control panel 110 stores in buffer memory 107 data about the travel forward and these data are used for travel backward, either in automatic mode when the recorded control actions are applied in reverse order, or in semi-automatic mode when the robot 111 stops for example before a bend and offers the operator parameters for turning. Because the movement parameters are recorded in a buffer memory 107, the initial sections of the travel are recalled from the buffer memory 107 as the latest and on the contrary the last section before coming back is recalled as the first. Memory management module 112 sends instructions to the control units 28 either directly from the central control unit 104, or from buffer memory 107 depending on the mode selected by the operator.

INDUSTRIAL APPLICABILITY

Proposed robot can be used for traveling and works in conduits of larger diameters, such as air ducts, exhaust ducts, sewerage pipes, chimneys and similar, in particular in situations, which require dragging heavy loads or possibly moving in sloped or vertical directions. Proposed robot is statically fixed in the conduit without using gravity. Robot can transport useful load, hoses or cables, injured persons and like. Works it can perform are in particular works requiring fixing of the robot in the conduit, such as grinding, drilling, blowing, blasting, washing and similar.

The invention claimed is:

1. A robot for cleaning and inspecting conduits comprising:
at least three driving units; and
a synchronizing mechanism comprising a guiding device attached to the robot, a carriage attached to the guiding device, and an actuator;
each driving unit being radially symmetrically attached to the carriage by a first arm comprising a first portion formed to be perpendicular to a second portion, and a second arm, the first and second arms of each driving unit being adapted to extend the driving unit radially outward from the robot, the first and second arms of each driving unit pivoting within a plane passing through a longitudinal axis of the robot;
wherein the first portion of the first arm of each driving unit is connected to a rod attached to the carriage and extends to a pivot point secured to the robot, the second portion of the first arm extending from the pivot point to the driving unit, the first arm transforming a carriage force generated during longitudinal translation of the carriage along the longitudinal axis of the robot to a driving unit force acting on each driving unit, the driving unit force being linearly proportional to the carriage force and independent of an angular position of the first arm;
wherein the second arm of each driving unit is pivotally secured to the robot; and
wherein the first and second arms of each driving unit remain substantially parallel to each other as the carriage longitudinally translates along the longitudinal axis of the robot and as the first and second arms are extended radially outward from the robot.

2. The robot of claim 1, wherein the robot further comprises a nozzle connected to a hose passing generally through an axis of the robot parallel to the longitudinal axis of the robot.

3. The robot of claim 1, wherein the robot further comprises a headlight, and a video camera provided on a front side of the robot.

4. The robot of claim 1, wherein the robot further comprises a control unit, the control unit being interconnected with a control panel formed by a central control unit and a monitor.

5. The robot of claim 1, wherein the actuator of the synchronizing mechanism comprises a pneumatic actuator that is formed by a set of pneumatic cylinders which are generally parallel to the longitudinal axis of the body and are attached to the body with pistons attached to the carriage, wherein the pneumatic cylinders are connected to a regulator of air pressure.

6. The robot of claim 1, wherein the driving units are pivotally attached to the first and second arms so that the driving units are held against an inner wall of the conduit.

7. The robot according to claim 1, wherein the robot further comprises a sensor for determining a position of the synchronizing mechanism, and/or an inclinometer, and/or gyroscope.

8. The robot according to claim 4, wherein the central control unit of the control panel has an output interconnected with each of the driving units, a first input of the central control unit being connected with an output of a first control element for setting a required radius of the robot when turning in a bend, a second input being connected with an output of a second control element for setting a required direction of the robot when turning in a bend, a third input being connected with an output of a third control element for setting a robot speed in conduit wherein an output signal of the central control unit is determined according to formula $(R-\cos(A)/2)/(R+\frac{1}{2})*V$, where R is a radius of bend measured in multiples of diameter of the conduit as a non-dimensional number and entered by the first control element, A is an angle between the vector directed into the bend entered by the second control element and a vector perpendicular to the axis of the conduit for an associated driving unit, and V is a speed of the robot movement in the conduit entered by the third control element.

* * * * *